(12) United States Patent
Kuhn et al.

(10) Patent No.: US 11,698,156 B2
(45) Date of Patent: Jul. 11, 2023

(54) SYSTEMS AND METHODS FOR A CONNECTOR ASSEMBLY

(71) Applicant: ILLINOIS TOOL WORKS INC., Glenview, IL (US)

(72) Inventors: Joseph C. Kuhn, Des Plaines, IL (US); Dennis M. Mark, Buffalo Grove, IL (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 551 days.

(21) Appl. No.: 16/765,558

(22) PCT Filed: Dec. 20, 2018

(86) PCT No.: PCT/US2018/066708
§ 371 (c)(1),
(2) Date: May 20, 2020

(87) PCT Pub. No.: WO2019/126447
PCT Pub. Date: Jun. 27, 2019

(65) Prior Publication Data
US 2020/0309298 A1    Oct. 1, 2020

Related U.S. Application Data

(60) Provisional application No. 62/608,600, filed on Dec. 21, 2017.

(51) Int. Cl.
*F16L 37/084* (2006.01)
*F16L 37/088* (2006.01)
*G06K 7/10* (2006.01)

(52) U.S. Cl.
CPC ......... *F16L 37/0885* (2019.08); *F16L 37/084* (2013.01); *G06K 7/10366* (2013.01); *F16L 2201/10* (2013.01)

(58) Field of Classification Search
CPC ... F16L 37/084; F16L 37/088; F16L 37/0885; F16L 2201/10
See application file for complete search history.

(56) References Cited

U.S. PATENT DOCUMENTS

2005/0063125 A1    3/2005  Kato
2005/0136741 A1    6/2005  Yoshida et al.
(Continued)

FOREIGN PATENT DOCUMENTS

EP    3179148 A1    6/2017
WO    2007003770 A1    1/2007

OTHER PUBLICATIONS

Office Action for counterpart German Patent Application No. 11 2018 006 538.3, dated Nov. 16, 2022 (11 pages).
(Continued)

*Primary Examiner* — Aaron M Dunwoody
(74) *Attorney, Agent, or Firm* — Quarles & Brady LLP

(57) ABSTRACT

A connector assembly is provided. The connector assembly includes a connector body, a movable component selectively movable between an uninstalled state and an installed state, a digital tag, and a digital blocker. When the movable component is moved from the uninstalled state to the installed state, the digital blocker is moved relative to the digital tag from a position where the digital tag is blocked by the digital blocker to a position where the digital tag is unblocked by the digital blocker, thereby providing a digital indication of a successful connection between the connector body and the movable component.

20 Claims, 13 Drawing Sheets

(56) References Cited

U.S. PATENT DOCUMENTS

| | | |
|---|---|---|
| 2009/0066531 A1 | 3/2009 | Boubtane et al. |
| 2010/0116365 A1 | 5/2010 | McCarty |
| 2012/0242080 A1 | 9/2012 | Nezu |
| 2012/0326885 A1 | 12/2012 | McCarty |
| 2016/0169069 A1* | 6/2016 | Weber .................... F16L 53/38 123/573 |

OTHER PUBLICATIONS

International Search Report and Written Opinion of the International Searching Authority from corresponding PCT Application No. PCT/US2018/066708, dated Apr. 5, 2019 (11 pages).

* cited by examiner

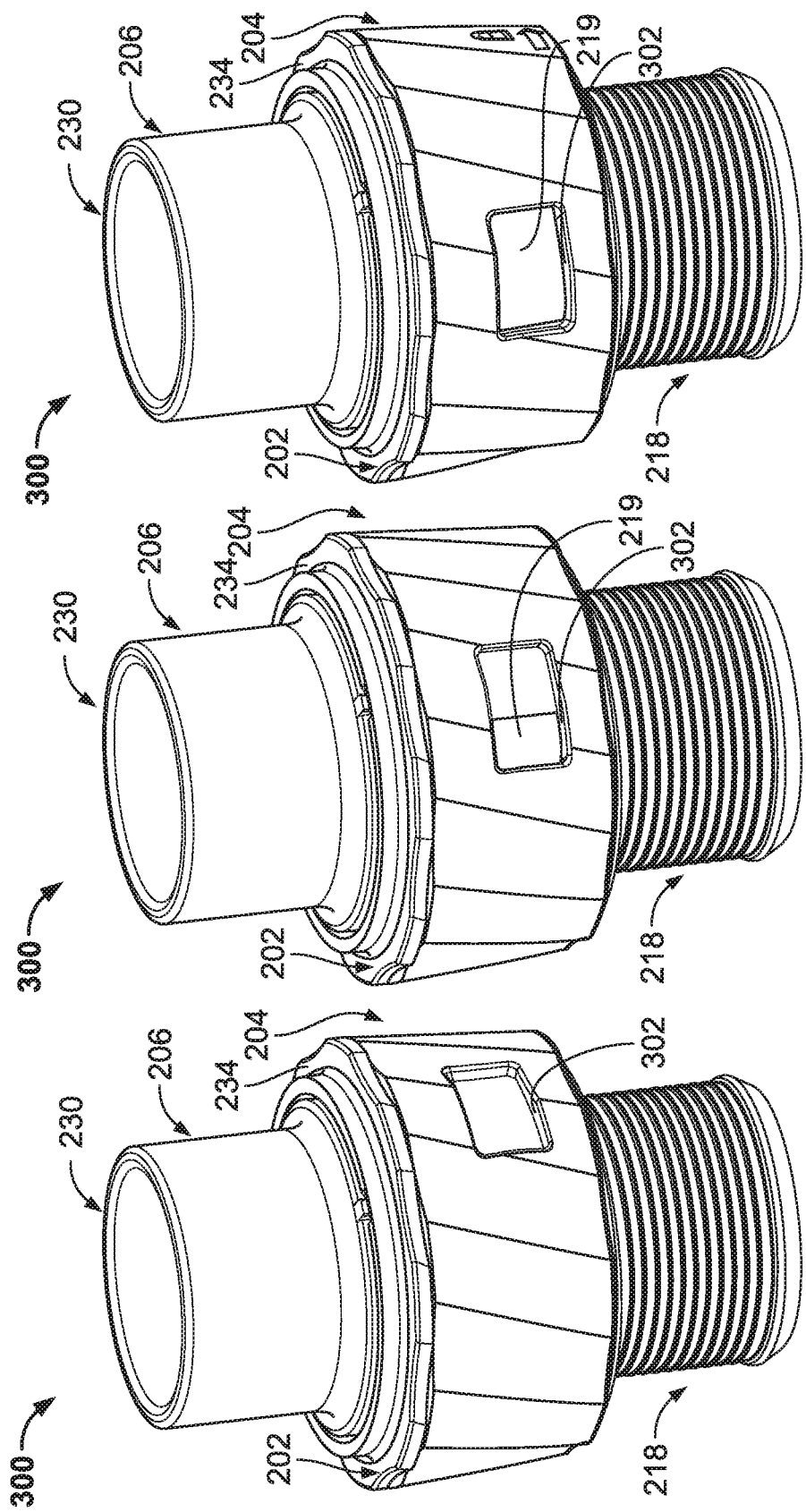

SYSTEMS AND METHODS FOR A CONNECTOR ASSEMBLY

CROSS-REFERENCES TO RELATED APPLICATIONS

This application represents the United States National Stage of International Application No. PCT/US2018/066708, filed Dec. 20, 2018, which claims priority to, U.S. Provisional Patent Application No. 62/608,600, filed on Dec. 21, 2017, entitled "Quick Connect Coupling Assemblies," each of which are hereby incorporated by reference in their entirety.

STATEMENT REGARDING FEDERALLY SPONSORED RESEARCH

Not Applicable.

BACKGROUND

Generally, mechanically-based quick connectors are used to provide a connection between two components (e.g., tubes, hoses, pipes, conduits, etc.). In some instances, a quick connector may utilize a push-to-connect or a twist-to-connect mechanism to facilitate the quick connection between a connector body and another component.

BRIEF SUMMARY

The present disclosure provides a connector assembly designed to provide an indication, when connection has been completed and locked, that does not rely solely on an operator/user. In some configurations, the connector assembly may be configured to provide a digital indication (e.g., via a radio frequency identification (RFID) tag) that may be tracked in a production control system.

In one aspect, the present disclosure provides a connector assembly including a connector body, a movable component selectively movable between an uninstalled state and an installed state, a digital tag, and a digital blocker. When the movable component is moved from the uninstalled state to the installed state, the digital blocker is moved relative to the digital tag from a position where the digital tag is blocked by the digital blocker to a position where the digital tag is unblocked by the digital blocker, thereby providing a digital indication of a successful connection between the connector body and the movable component.

In another aspect, the present disclosure provides a connector assembly including a connector body, a movable component selectively movable between an uninstalled state and an installed state, a digital tag, and a digital blocker. The selective movement of the movable component between the uninstalled state and the installed state results in blocking and unblocking of the digital tag via relative movement between the digital blocker and the digital tag. Blocking and unblocking the digital tag via relative movement between the digital blocker and the digital tag provides a digital status of a connection between the connector body and the movable component.

In another aspect, the present disclosure provides a method for indicating a connection status on a connector assembly. The connector assembly includes a connector body, a movable component, a digital tag, a digital blocker, and a fitting. The method includes blocking, via the digital blocker, an output signal of the digital tag, inserting an end of the fitting into the connector body, moving the movable component relative to the connector body from an uninstalled state to an installed state, and in response to moving the movable component relative to the connector body from the uninstalled state to the installed state, unblocking, via movement of the digital blocker relative to the digital tag, the output signal of the digital tag. The method further includes providing an indication of a successful connection status between the fitting and the connector body based on the unblocked output signal from the digital tag.

The foregoing and other aspects and advantages of the disclosure will appear from the following description. In the description, reference is made to the accompanying drawings, which form a part hereof, and in which there is shown by way of illustration a preferred configuration of the disclosure. Such configuration does not necessarily represent the full scope of the disclosure, however, and reference is made therefore to the claims and herein for interpreting the scope of the disclosure.

BRIEF DESCRIPTION OF DRAWINGS

The invention will be better understood and features, aspects and advantages other than those set forth above will become apparent when consideration is given to the following detailed description thereof. Such detailed description makes reference to the following drawings.

FIG. 18 is a top, front, right isometric view of the connector assembly of FIG. 17 with a movable component in an uninstalled state;

FIG. 19 is a top, front, right isometric view of the connector assembly of FIG. 17 with a movable component between an uninstalled state and an installed state; and FIG. 20 is a top, front, right isometric view of the connector assembly of FIG. 17 with a movable component in an installed state.

DETAILED DESCRIPTION

Figure 1:
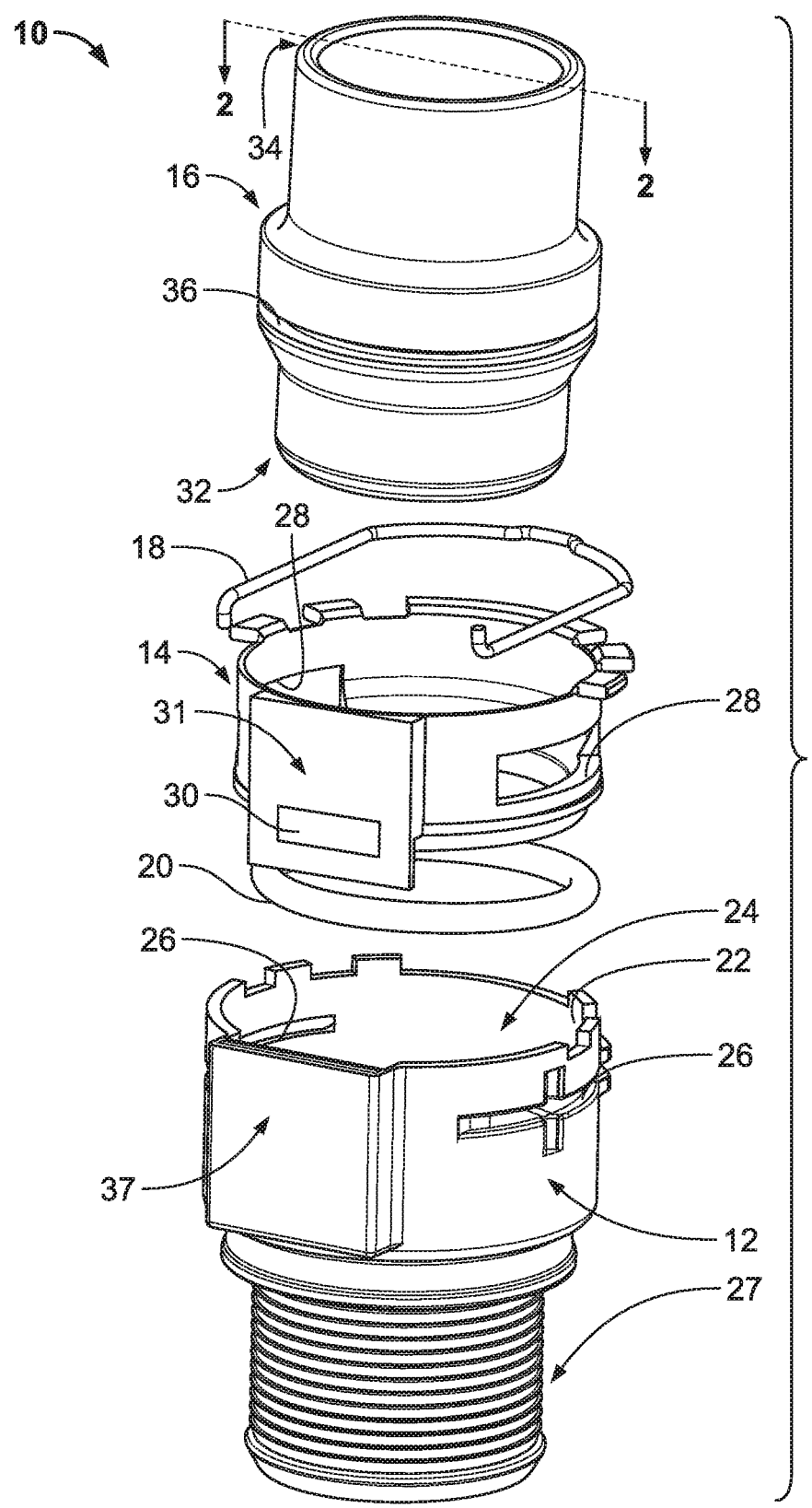
FIG. 1 is an exploded top, front, right isometric view of a connector assembly according to one embodiment of the present disclosure.
Figure 2:
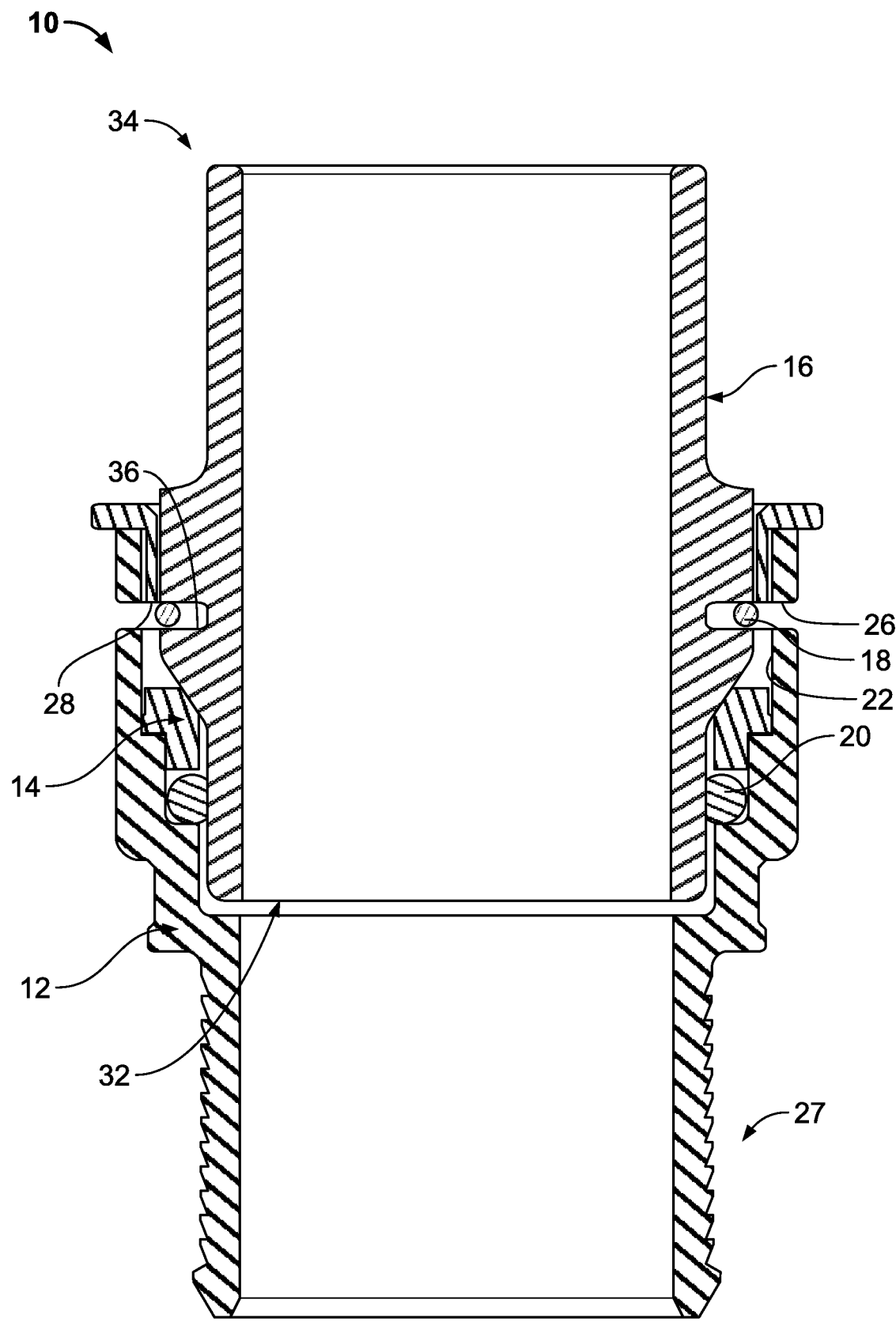
FIG. 2 is a cross-sectional view of the connector assembly of FIG. 1 taken along line 2-2 with the connector assembly assembled.
Figure 3:
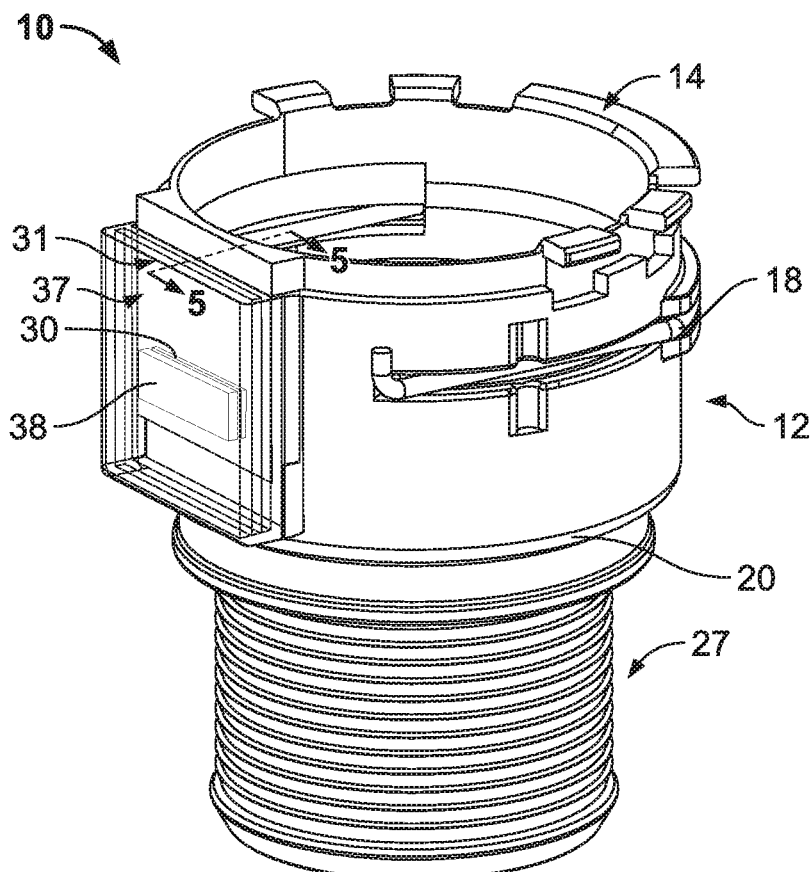
FIG. 3 is a top, front, right isometric view of the connector assembly of FIG. 1 with a portion of a connector body transparent and a movable component in an uninstalled state.

Conventional connector assemblies that utilize a quick connection (e.g., push to connect, twist to connect, or combinations thereof) may rely on one or more of visual indicators, haptic indicators, and audible indicators to confirm successful installation. These types of indicators are difficult for an operator or user to accurately and consistently determine the success or failure of installation.

In general, the present disclosure overcomes these deficiencies in conventional connector assemblies by providing a connector assembly that may include a digital tag that allows full installation and locking to be digitally represented. In some embodiments, the digital tag may be at least partially blocked when a movable component of the connector assembly is in an uninstalled state, and unblocked when the movable component is in a fully installed state and locked. In this way, for example, an output signal of the digital tag may transition between a readable state and an unreadable state, which allows an external system or device to verify successful installation and negates the need for an operator or user to be the sole source of determining whether installation was successful or unsuccessful. In addition, the use of an external system or device enables the installation feedback to be tracked and stored in a production control system, for example, on an assembly line.

The use of a digital tag on a connector assembly to provide a digital indication of successful installation will be described with reference to various non-limiting connector configurations. It should be appreciated that the design and properties of the digital tag indication described herein may be applied to various mechanical connectors. For example, the digital tag indication may be applied to push-to-connect couplings, twist-to-connect couplings, fasteners, clips, or any other mechanical connector that requires one component to be moved relative to a connector body to achieve an installed, locked, fastened, or coupled state. In some embodiments, the digital tag verification described herein may be applied to the connector assemblies disclosed in PCT/US2017/062985, which claims priority to U.S. Provisional Application No. 62/428,815, both of which are hereby incorporated by reference in their entireties.

FIGS. 1-6 illustrate a coupling assembly 10 according to the present disclosure. In the illustrated embodiment, the coupling assembly 10 may include a connector body 12, a movable component 14 (e.g., an indicator ring), a fitting 16, a clip 18, and a seal 20 (e.g., an o-ring). The connector body 12 defines a generally cylindrical shape and includes an inner surface 22 that defines an inner bore 24 extending axially through the connector body 12. The use herein of the term "axial" and variations thereof refers to a direction that extends generally along an axis of symmetry, a central axis, or an elongate direction of a particular component or system. For example, axially extending features of a component may be features that extend generally along a direction that is parallel to an axis of symmetry or an elongate direction of that component.

The connector body 12 includes a pair of opposed body slots 26 extending radially therethrough and a connecting end 27 arranged axially away from the body slots 26. The use herein of the term "radial" and variations thereof refers to directions that are generally perpendicular to a corresponding axial direction. For example, a radially extending structure of a component may generally extend at least partly along a direction that is perpendicular to a longitudinal or central axis of that component.

When the connector assembly 10 is assembled (see, e.g., FIG. 2), the clip 18 may be configured to extend around an outer periphery of the connector body 12 and be received within the body slots 26. In some non-limiting examples, the connecting end 27 of the connector body 12 may be configured to connect to a first external component (e.g., a hose, tube, pipe, or another structure).

In the illustrated embodiment of FIG. 1, the movable component 14 defines a ring shape that is configured to be slidably received within a portion of the connector body 12. In some embodiments, the movable component 14 may be fabricated from a material that allows digital signals to pass or transmit therethrough. The movable component 14 includes a pair of opposed component slots 28 extending radially therethrough and a digital blocker 30 (e.g., a conductor) attached to a portion thereof. When the connector assembly 10 is assembled (see, e.g., FIG. 2), the component slots 28 are configured to axially align with the body slots 26 to enable the clip 18 to extend through both the body slots 26 and the component slots 28.

The digital blocker 30 may be configured to block an output signal of a digital tag (i.e., prevent an external receiver or antenna from reading the output signal), when the digital blocker 30 at least partially overlaps the digital tag. In the illustrated embodiment, the digital blocker 30 may be arranged on a flat portion 31 of the outer periphery of the movable component 14. In some embodiments, the digital blocker 30 may be arranged on a curved portion of the outer periphery of the movable component 14. In some embodiments, for example, the digital blocker 30 may be configured to block an electromagnetic field from a digital tag reader's (e.g., an RFID tag reader) antenna. In some embodiments, the digital blocker 30 may be a conductive element, for example, a metal, a metal infused material, a conductive paint, a conductive surface coating on a plastic, and/or a material that can absorb and dampen an electromagnetic field.

The fitting 16 includes a first end 32, a second end 34, and a notch 36 arranged axially between the first end 32 and the second end 34. The second end 34 of the fitting 16 may be configured to connect to a second external component (e.g., a hose, tube, pipe, or another structure). Thus, the connector assembly 10 may facilitate the connection between the first external component (not shown) and the second external component (not shown). In the illustrated embodiment, the notch 36 extends radially into the fitting 16 from an outer periphery thereof. The portion of the fitting 16 including the notch 36 may define an increased diameter when compared to the first end 32 and the second end 34 to facilitate engagement with the inner bore 24 of the connector body 12 during installation.

During assembly of the connector assembly 10, the first end 32 of the fitting 16 is configured to be inserted through the movable component 14 and into the inner bore 24 of the connector body 12. When the fitting 16 is fully inserted into the connector body 12 (see, e.g., FIG. 2), the notch 36 axially aligns with the body slots 26 and the component slots 28 to enable the clip 18 to snap into the notch 36. In this way, for example, the clip 18 can lock the connector body 12, the movable component 14, and the fitting 16 together, when the connector assembly 10 is properly assembled. When the clip 18 snaps through the body slots 26 and the component slots 28, and into the notch 36, a haptic and/or visual indication may be provided to an operator or user that the movable component 14 and fitting 16 are fully installed into the connector body 12. In addition to the haptic and/or visual indication, the connector assembly 10 is configured to provide a digital indication of successful installation and locking via a digital tag.

With reference to FIGS. 3-6, in the illustrated embodiment, the connector body 12 may include a digital tag 38. In the illustrated embodiment, the digital tag 38 may be arranged within a flat portion 37 of the connector body 12 that corresponds with the flat portion 31 of the movable component 14 on which the digital blocker 30 is arranged. In some embodiments, the digital tag 38 may be arranged on a curved portion of the connector body 12. In any case, the digital tag 38 and the digital blocker 30 may be arranged on the connector body 12 and the movable component 14, such that the digital tag 38 and the digital blocker 30 align and overlap during installation of the movable component 14 and the fitting 16 into the connector body 12.

In some embodiments, the digital tag 38 may be a radio frequency identification (RFID) tag that is configured to output a unique digital signal. In some embodiments, the digital tag 38 may be circular, decal style, or pill style. In some embodiments, the digital tag 38 may be powered (active). In some embodiments, the digital tag 38 may be unpowered (passive).

Figure 4:
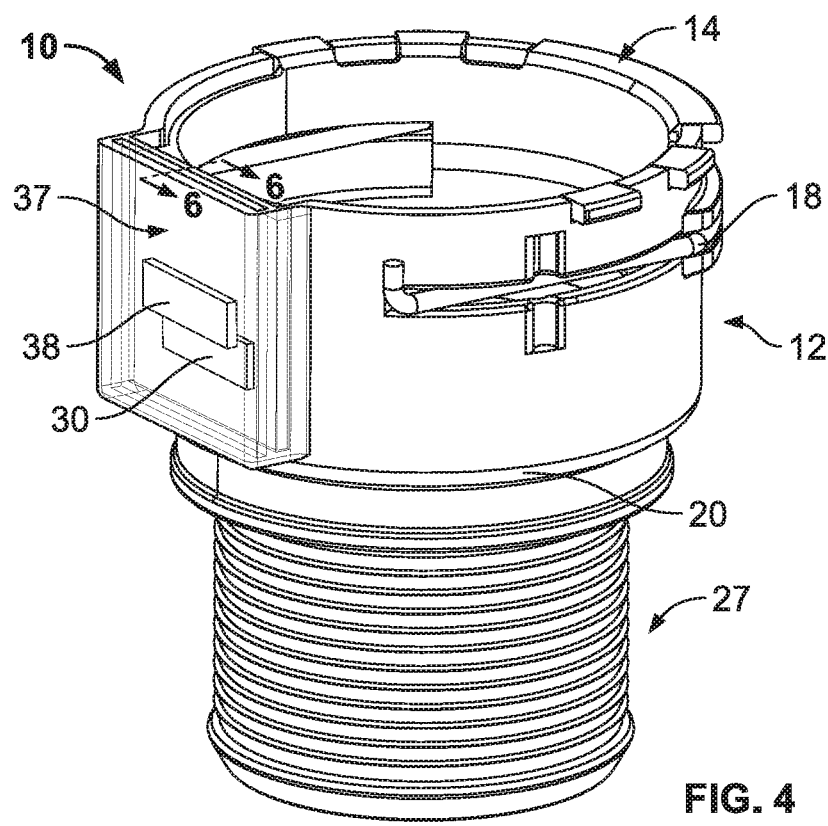
FIG. 4 is a top, front, right isometric view of the connector assembly of FIG. 1 with a portion of a connector body transparent and a movable component in an installed state.
Figure 6:
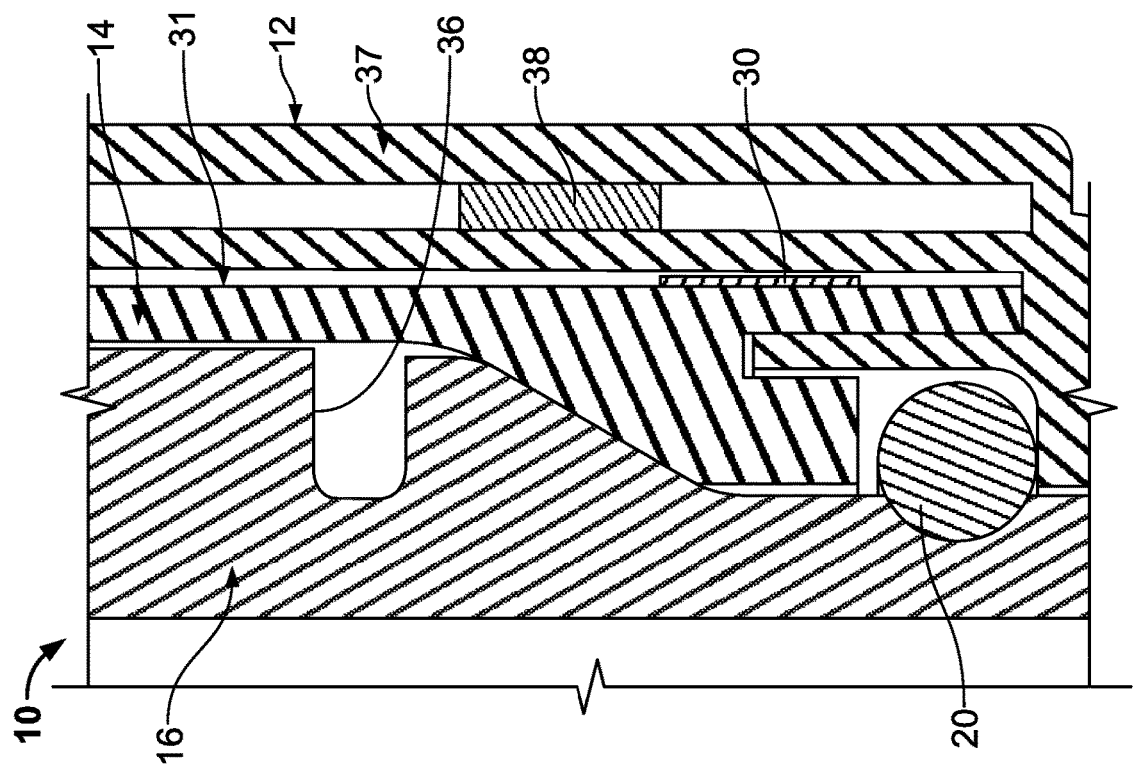
FIG. 6 is a partial cross-sectional view of the connector assembly of FIG. 4 taken along line 6-6.
Figure 5:
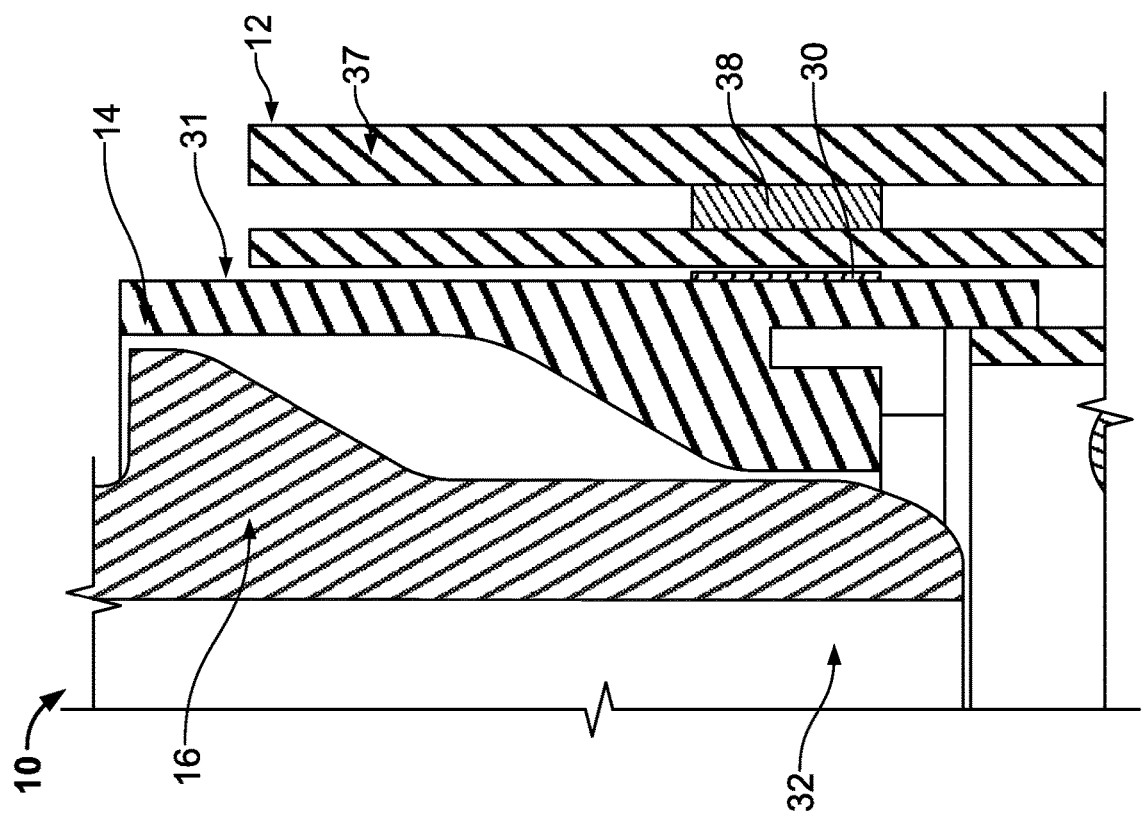
FIG. 5 is a partial cross-sectional view of the connector assembly of FIG. 3 taken along line 5-5.
Figure 7:
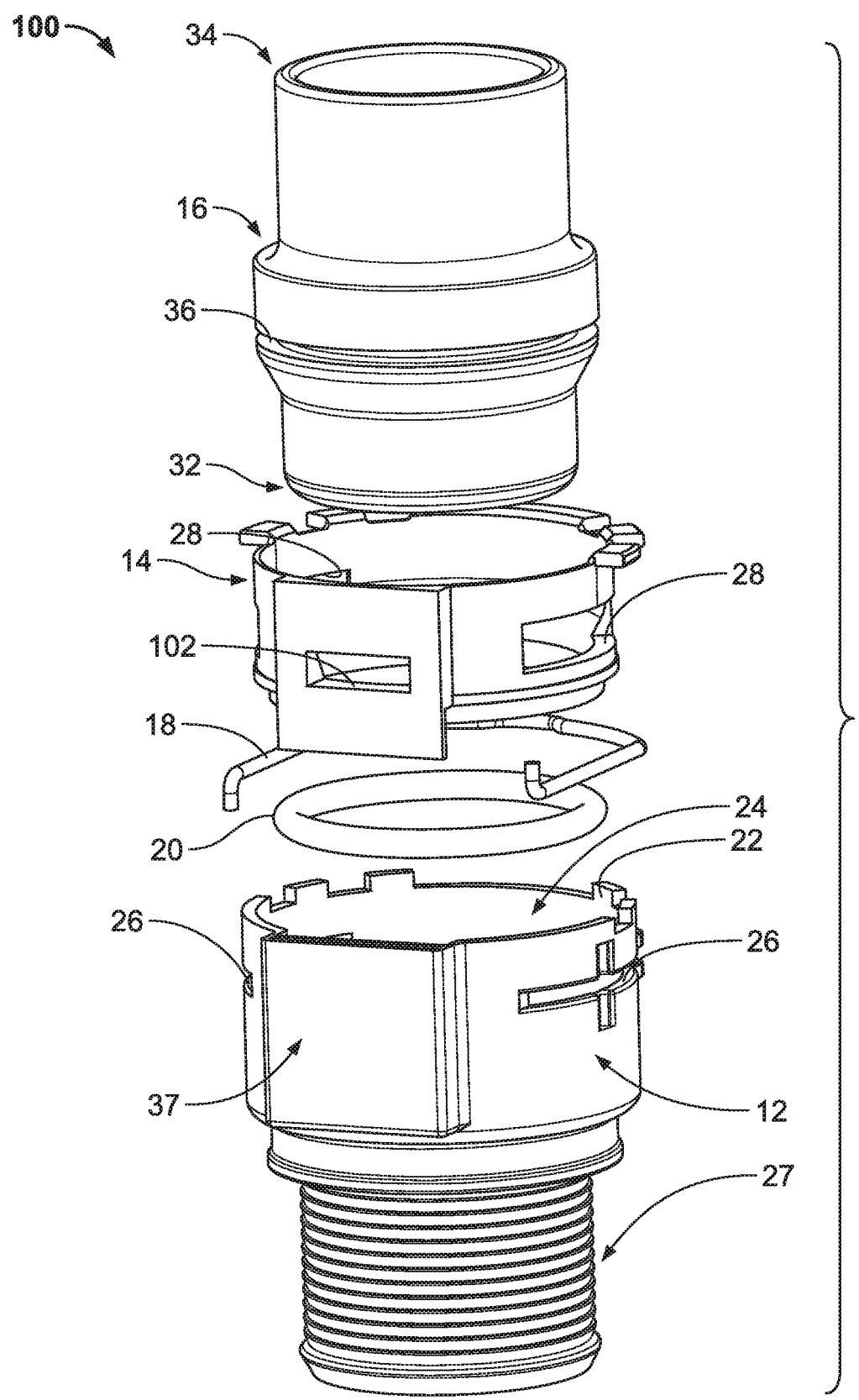
FIG. 7 is an exploded top, front, right isometric view of a connector assembly according to another embodiment of the present disclosure.
Figure 8:
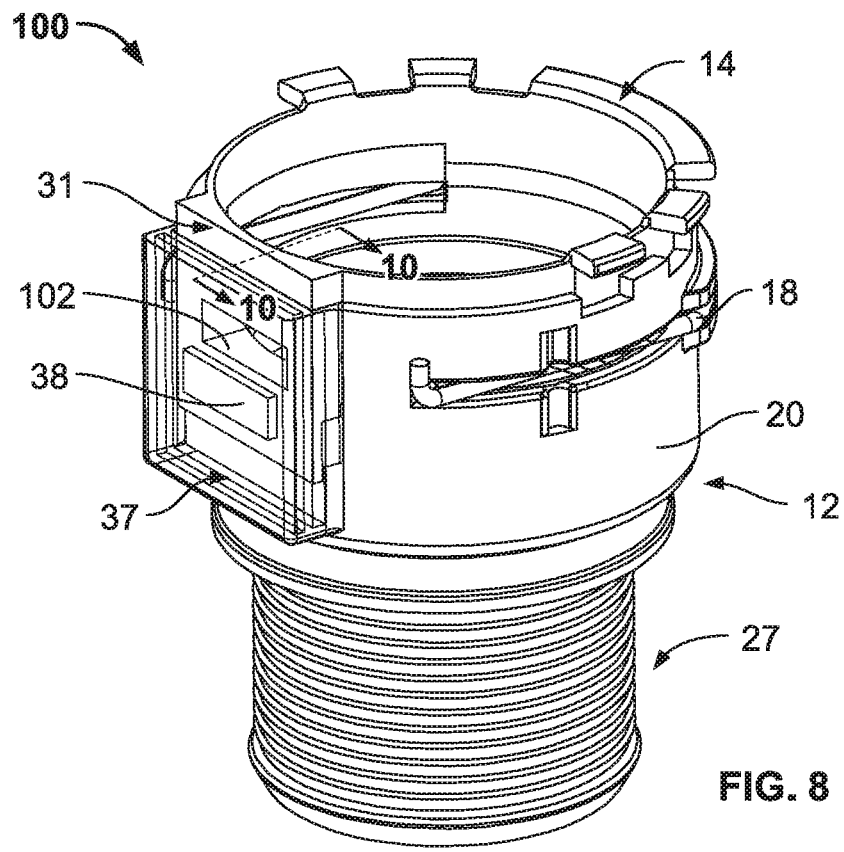
FIG. 8 is a top, front, right isometric view of the connector assembly of FIG. 7 with a portion of a connector body transparent and a movable component in an uninstalled state.
Figure 9:
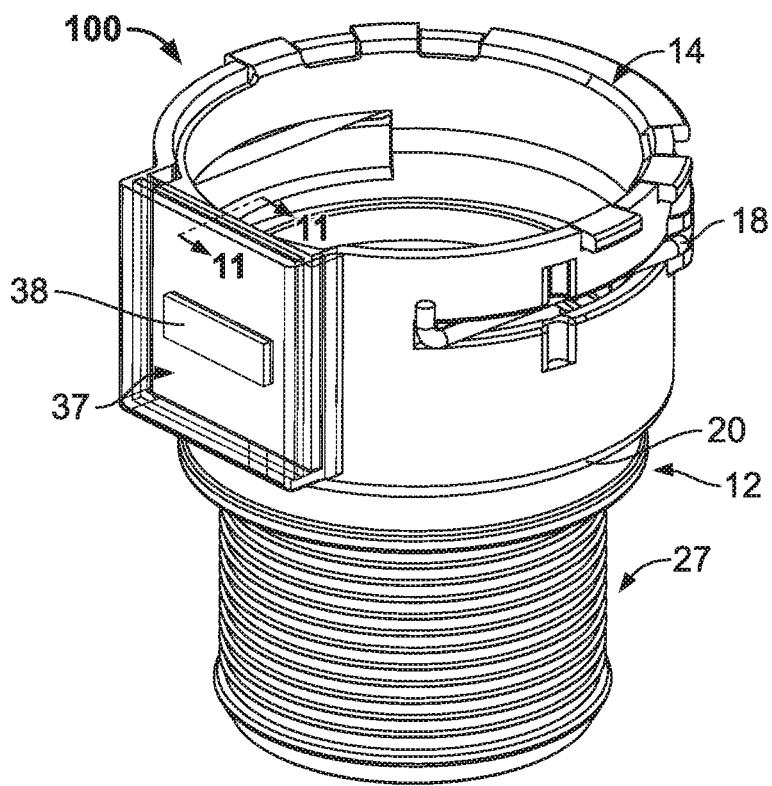
FIG. 9 is a top, front, right isometric view of the connector assembly of FIG. 7 with a portion of a connector body transparent and a movable component in an installed state.
Figure 11:
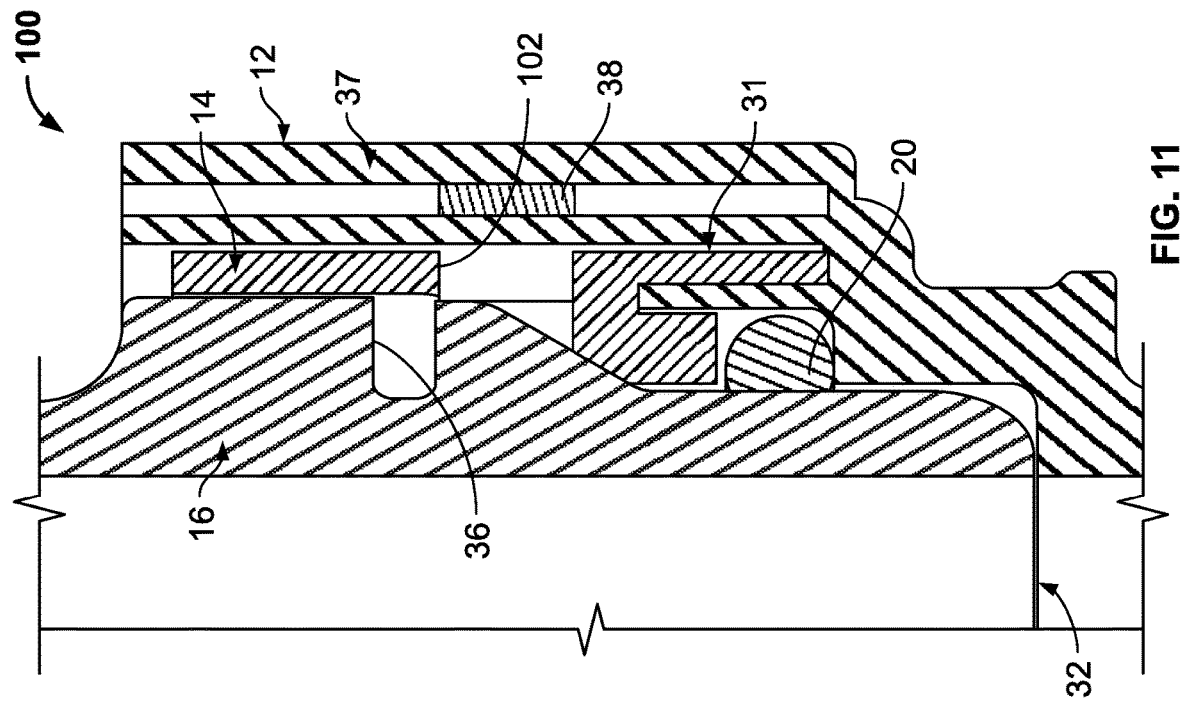
FIG. 11 is a partial cross-sectional view of the connector assembly of FIG. 9 taken along line 11-11.
Figure 10:
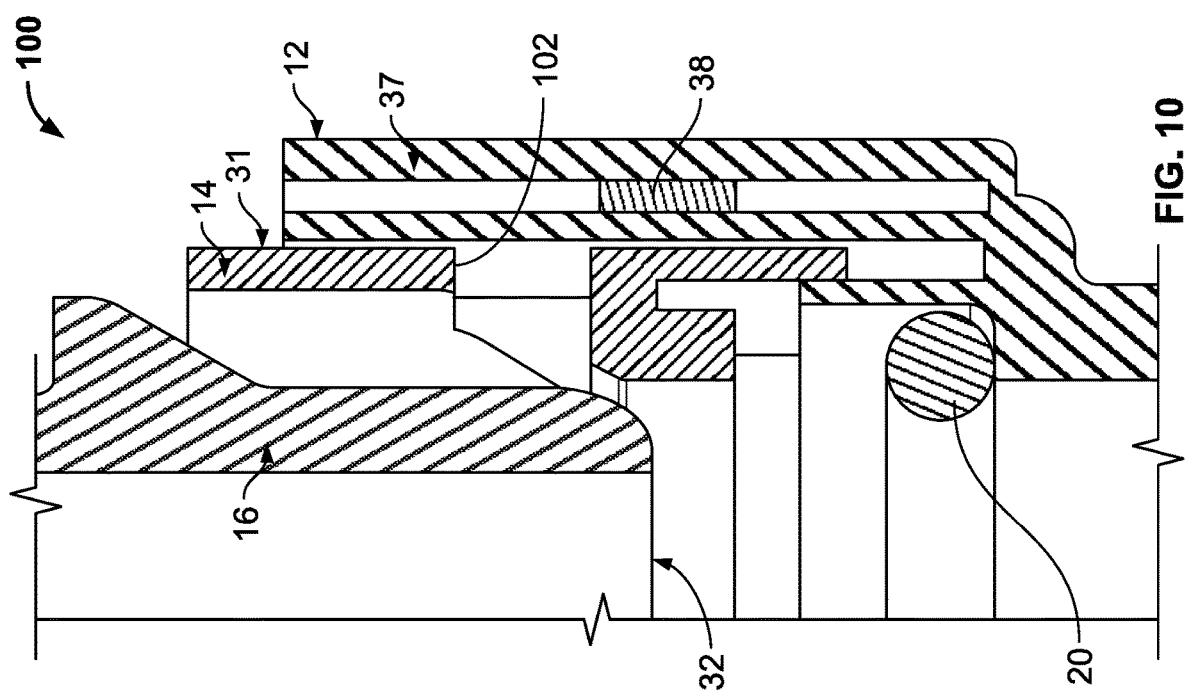
FIG. 10 is a partial cross-sectional view of the connector assembly of FIG. 8 taken along line 10-10.

In general, selective overlap between the digital blocker 30 and the digital tag 38 enables the connector assembly 10 to provide a digital indication of a status of the connection, for example, between the connector body 12, the movable component 14, and the fitting 16. In the illustrated embodiment, the movable component 14 is movable between an uninstalled state (FIGS. 3 and 5) and an installed state (FIGS. 4 and 6). In the uninstalled state, the movable component 14 is not fully inserted into and is unlocked relative to the connector body 12. In the installed state, the movable component 14 and the fitting 16 are fully inserted into and locked relative to the connector body 12 via the clip 18. That is, in the installed state, an outside force may be required to manipulate a component of the coupling assembly 10 to transition back to the uninstalled state. For example, an operator or user may be required to manipulate the clip 18 to unlock the movable component 14 and the fitting 16 relative to the connector body 12.

With the movable component 14 in the uninstalled state (FIGS. 3 and 5), the digital tag 38 may be at least partially aligned axially and overlap with the digital blocker 30. In this way, for example, the digital signal output by the digital tag 38 may be blocked and prevented from being read by an external receiver or antenna. As the movable component 14 moves from the uninstalled state to the installed state, the digital blocker 30 and the digital tag 38 may move relative to one another. Once the movable component 14 reaches the installed state, the digital blocker 30 may be axially offset from the digital tag 38, such that the digital blocker 30 does not overlap with digital tag 38. In this installed state (FIGS. 4 and 6), the digital signal output by the digital tag 38 may be unblocked and the digital tag 38 may be read by an external receiver or antenna. Thus, the digital tag 38 and the digital blocker 30 may provide a status of the connection between the connector body 12, the movable component 14, and the fitting 16 as the movable component 14 transitions between the uninstalled state and the installed state.

It should be appreciated that the above-described functionality of the digital tag 38 and the digital blocker 30 would perform equally as well with the positions of the digital tag 38 and the digital blocker 30 reversed. That is, in some embodiments, the digital tag 38 may be arranged on the movable component 14, and the digital blocker 30 may be arranged on the connector body 12.

FIGS. 7-11 illustrate another connector assembly 100 according to the present disclosure. The connector assembly 100 may be similar in design and functionality to the coupling assembly 10, with similar elements identified using like reference numerals, except as described below or as apparent from the figures. In some embodiments, the digital blocker 30 may be integrated into the movable component 14. For example, in some embodiments, the movable component 14 may be fabricated from a material configured to block digital signals. In some embodiments, a portion of the movable component 14 that interacts and/or aligns with the digital tag 38 may be fabricated from or include additives (e.g., resins) that enable the blocking of digital signals. In some embodiments, the movable component 14 may include a separate shielding material attached thereto or integrated therein.

In the illustrated embodiment, the flat portion 31 of the movable component 14 may include a window 102 that extends therethrough. The window 102 is configured to align and overlap with the digital tag 38 during installation of the movable component 14 and the fitting 16 into the connector body 12. In some embodiments, the window 102 may be arranged on any portion of the movable component 14 that aligns with the digital tag 38 to ensure overlap when the movable component 14 and the fitting 16 are installed into the connector body 12.

During installation, when the movable component 14 is in the uninstalled state (FIGS. 8 and 10), at least a portion of the movable component 14 may be aligned and overlap with the digital tag 38, which blocks the digital signal output thereby. Once the movable component 14 and the fitting 16 are inserted to the installed state (FIGS. 9 and 11), the window 102 aligns axially with the digital tag 38, such that the digital tag 38 is unblocked by the movable component 14. In this way, the digital signal output by the digital tag 38 may be read by an external receiver or antenna. The selective blocking and unblocking of the digital tag 38, via the window 102, may provide a status of the connection between the connector body 12, the movable component 14, and the fitting 16 as the movable component 14 transitions between the uninstalled state and the installed state.

The above described connector assembly 10 and the connector assembly 100 transition between the uninstalled state and the installed state due to an linear input force applied to the movable component 14 and the fitting 16. In the illustrated embodiment, the linear input force may be in a direction parallel to the axial direction. In some non-limiting examples, the linear input force may be in a radial direction or a direction normal to an outer surface of the connector body 12 (e.g., a button or lever may be arranged on the outer surface of the connector body 12, which may be actuated to move the digital blocker 30 and the digital tag 38 relative to one another).

In some embodiments, a connector assembly according to the present disclosure may transition between the uninstalled state and the installed state in response to a rotational input force. For example, FIGS. 12-16 illustrate an embodiment of a connector assembly 200 that transitions to an installed, locked state in response to a rotational input force. In the illustrated embodiment, the connector assembly 200 includes a connector body 202, a movable component 204, a fitting 206, a clip 208, and an intermediate ring 210. The connector body 202 defines a generally cylindrical shape and includes an inner surface 212 that defines an inner bore 214 extending axially through the connector body 202.

The connector body 202 includes a pair of opposed body slots 216 extending radially therethrough, a connecting end 218 arranged axially away from the body slots 216, and a digital tag 219. In the illustrated embodiment, the digital tag 219 is attached to an outer periphery of the connector body 202. In some embodiments, the digital tag 219 may be a radio frequency identification (RFID) tag that is configured to output a unique digital signal. In some embodiments, the digital tag 219 may be circular, decal style, or pill style. In some embodiments, the digital tag 219 may be powered (active). In some embodiments, the digital tag 219 may be unpowered (passive).

When the connector assembly 200 is assembled (see, e.g., FIG. 13), the clip 208 may be configured to extend around an outer periphery of the connector body 202 and be received within the body slots 216. In some non-limiting examples, the connecting end 218 of the connector body 202 may be configured to connect to a first external component (e.g., a hose, tube, pipe, or another structure).

In the illustrated embodiment, the movable component 204 defines a ring shape that is configured to be rotatably received by an outer periphery of the connector body 202. In some non-limiting examples, the movable component 204 may be fabricated from a material that allows digital signals to pass or transmit therethrough. With specific reference to FIG. 14, an inner surface 224 of the movable component 204 includes a digital blocker 226 (e.g., a conductor) attached thereto. The digital blocker 226 may be configured to block an output signal of the digital tag 219 (i.e., prevent an external receiver or antenna from reading the output signal), when the digital blocker 226 at least partially overlaps the digital tag 219. When the connector assembly 200 is assembled, the digital tag 219 and the digital blocker 226 may be configured to axially align and at least partially overlap during the installation and locking of the fitting 206 into the connector body 202 as will be described herein.

Figure 12:
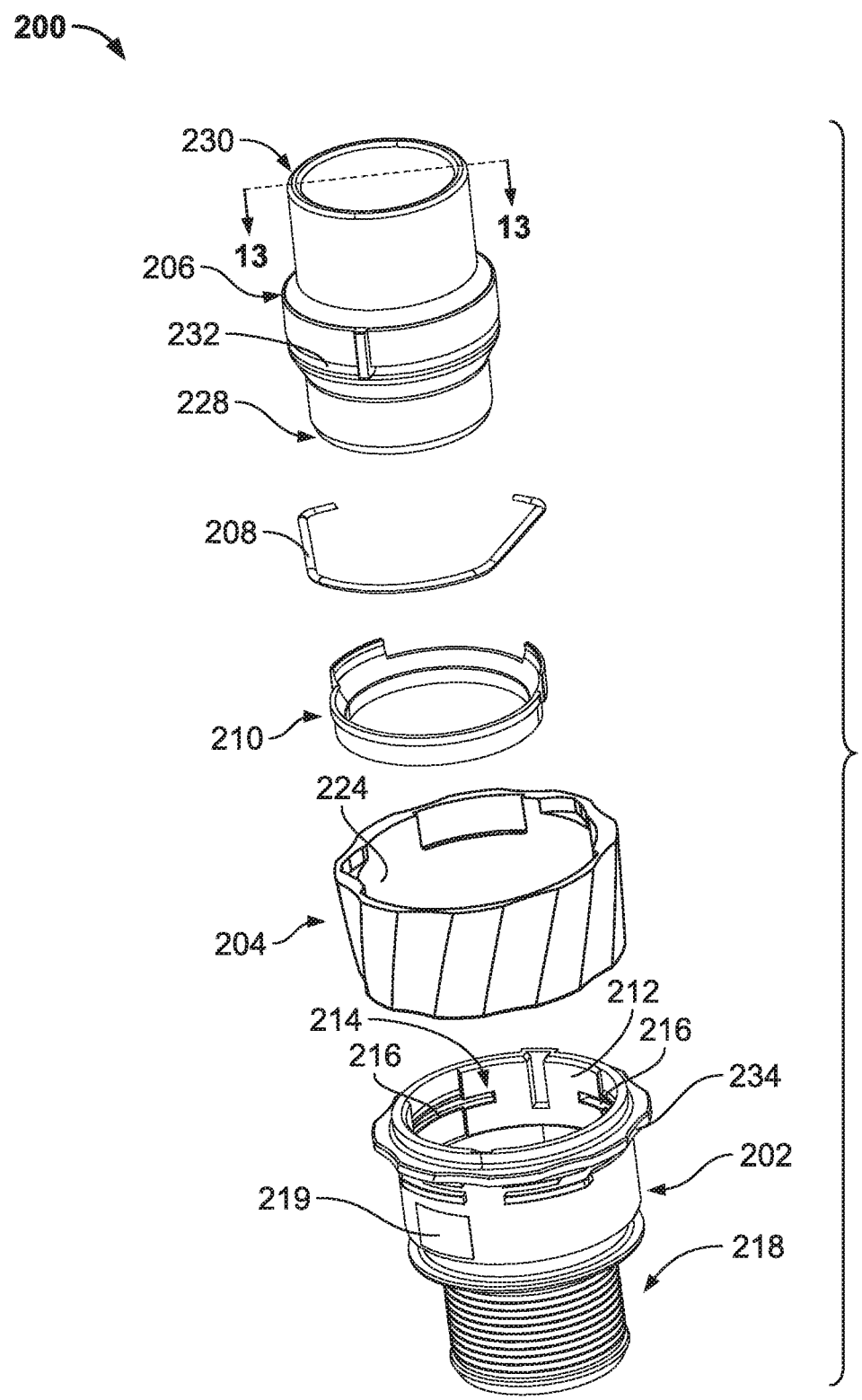
FIG. 12 is an exploded top, front, right isometric view of a connector assembly according to another embodiment of the present disclosure.
Figure 13:
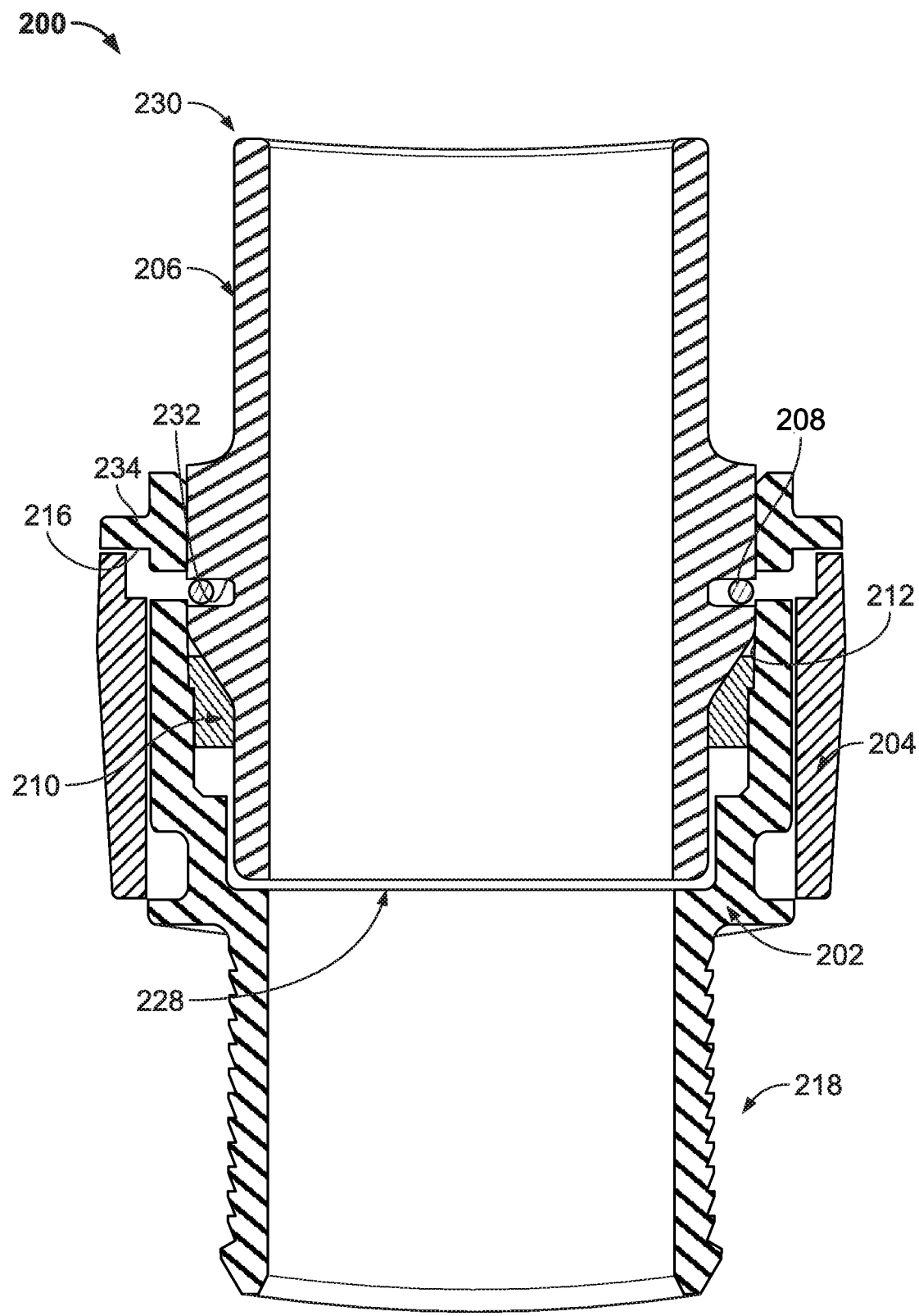
FIG. 13 is a cross-sectional view of the connector assembly of FIG. 12 taken along line 13-13.
Figure 14:
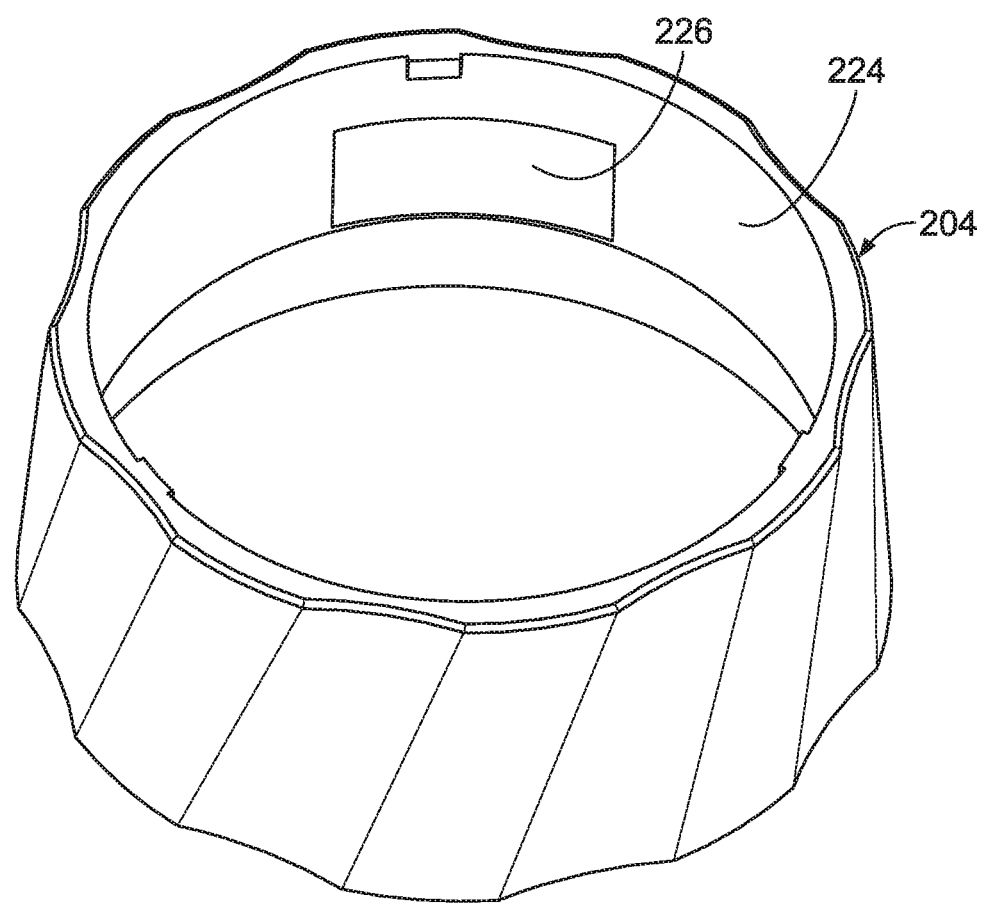
FIG. 14 is a back, top, left isometric view of a movable component of the connector assembly of FIG. 12.

As illustrated in FIGS. 12 and 13, the fitting 206 includes a first end 228, a second end 230, and a notch 232 arranged axially between the first end 228 and the second end 230. The second end 230 of the fitting 206 may be configured to connect to a second external component (e.g., a hose, tube, pipe, or another structure). Thus, the connector assembly 200 may facilitate the connection between the first external component (not shown) and the second external component (not shown). In the illustrated embodiment, the notch 232 extends radially into the fitting 206 from an outer periphery thereof.

During assembly of the connector assembly 200, the first end 228 of the fitting 206 is configured to be inserted into the inner bore 214 of the connector body 202. When the fitting 206 is fully inserted into the connector body 202 (see, e.g., FIG. 13), the notch 232 axially aligns with the body slots 216. The movable component 204 may then be inserted over the outer periphery of the connector body 202 until the movable component 204 engages a flange 234 extending radially from the outer periphery of the connector body 202. Subsequently, the movable component 204 may be rotated in a desired direction to fasten the movable component 204 to the connector body 202 and facilitate the installation and locking of the movable component 204 and the fitting 206 relative to the connector body 202. For example, once the movable component 204 is fully rotated to the locked position, features of the movable component 204 (e.g., grooves and/or protrusions arranged on the inner surface 224) may displace the clip 208 laterally inward to be received within the body slots 216 and the notch 232. In this way, for example, the clip 208 can lock the connector body 202 and the fitting 206 together, when the connector assembly 200 is successfully assembled.

Figure 15:
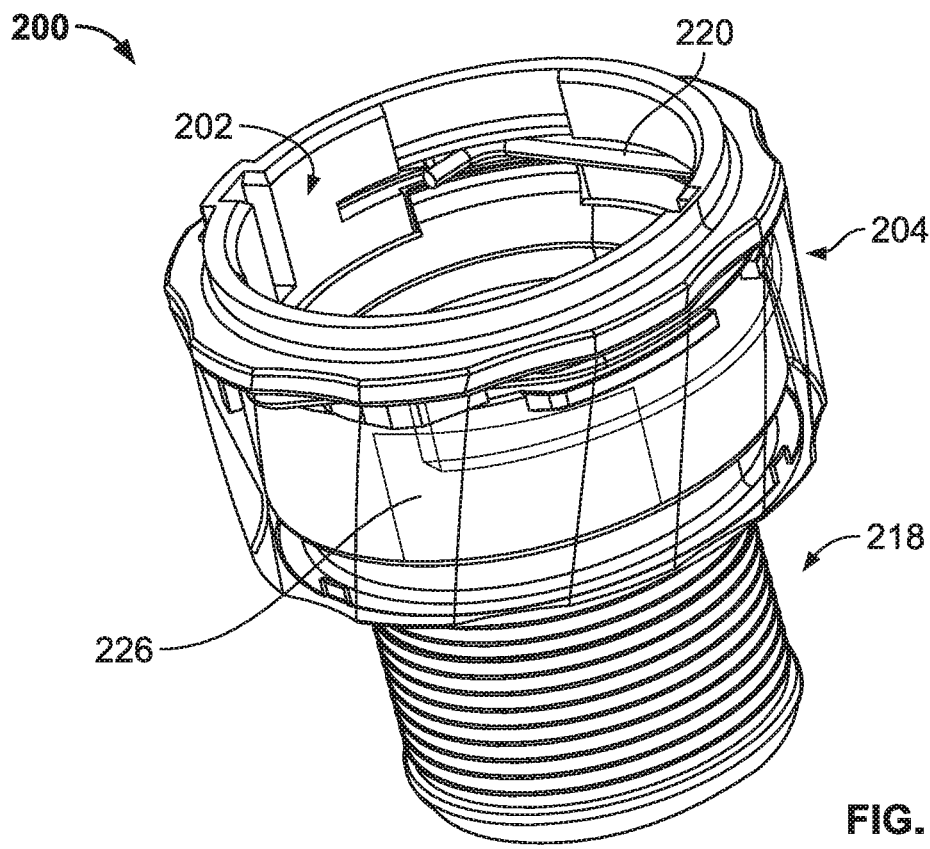
FIG. 15 is a top, front, right isometric view of the connector assembly of FIG. 12 with a movable component transparent and in an uninstalled state.
Figure 16:
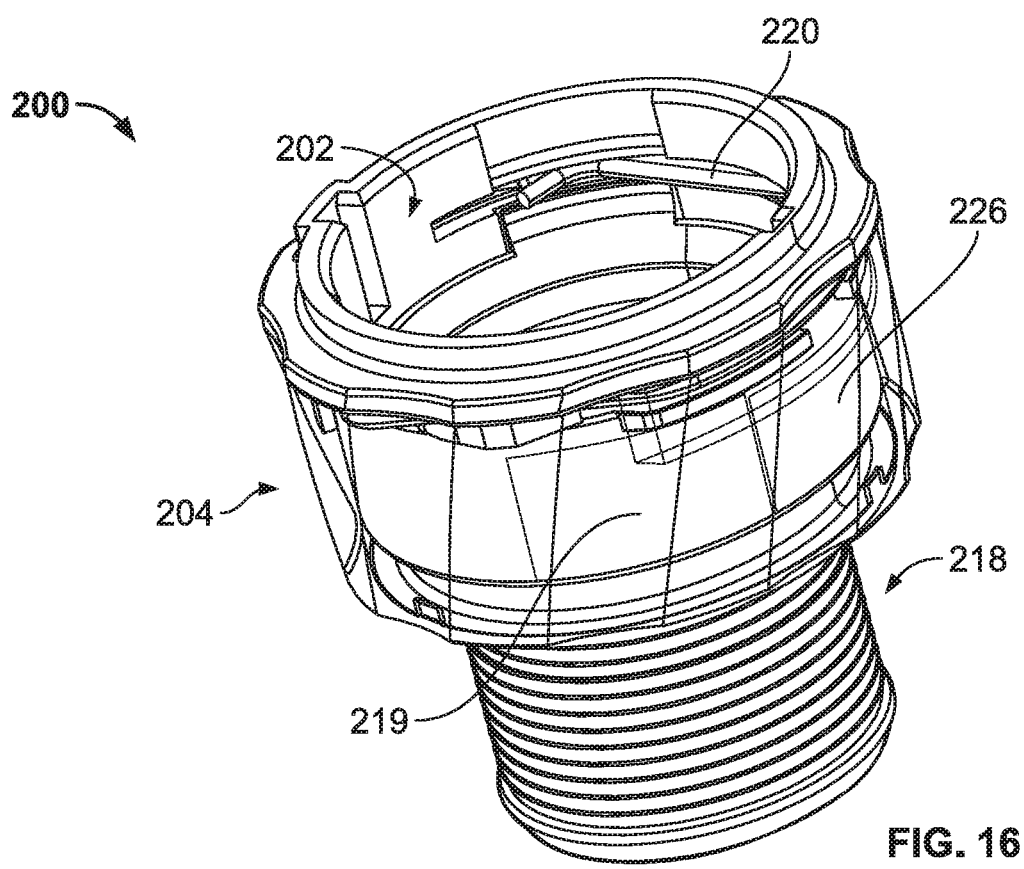
FIG. 16 is a top, front, right isometric view of the connector assembly of FIG. 12 with a movable component transparent and in an installed state.
Figure 17:
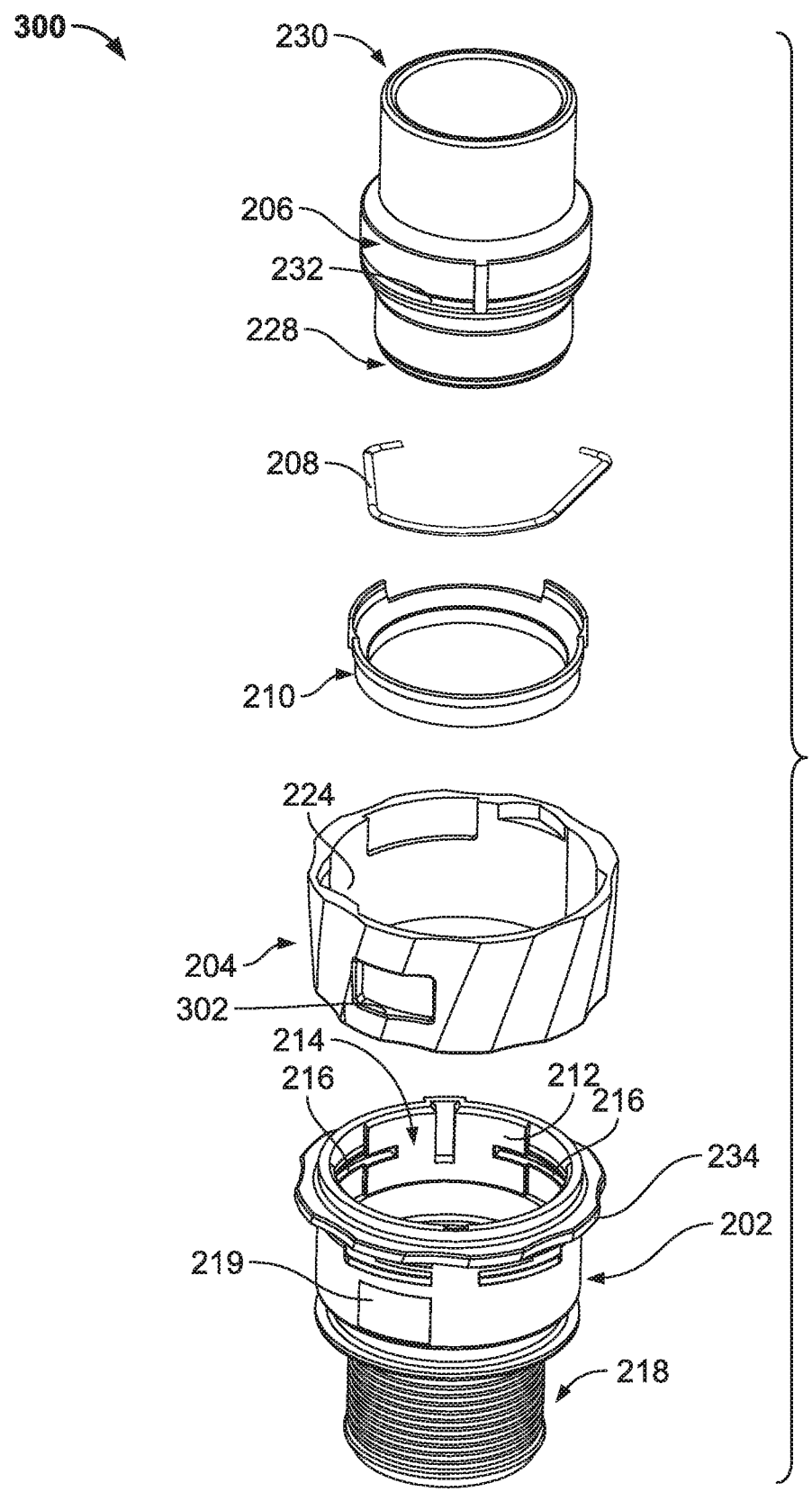
FIG. 17 is an exploded top, front, right isometric view of a connector assembly according to another embodiment of the present disclosure.

Turning to FIGS. 15 and 16, the connector assembly 200 is configured to provide a digital indication of full installation and locking via the digital tag 219. In general, selective overlap between the digital blocker 226 and the digital tag 219 enables the connector assembly 200 to provide a digital indication of a status of the connection, for example, between the connector body 202, the movable component 204, and the fitting 206. In the illustrated embodiment, the movable component 204 is rotatably movable between an uninstalled state (FIG. 15) and an installed state (FIG. 16). In the uninstalled state, the movable component 204 is not fully fastened to the outer periphery of the connector body 202 and the fitting 206 may be unlocked relative to the connector body 202. In the installed state, the movable component 204 may be fully rotated relative to the connector body 202, which fastens the movable component 204 to the connector body 202 and forces the clip 208 laterally inward to lock the fitting 206 relative to the connector body 202. In the installed state, an outside force may be required to manipulate a component of the coupling assembly 200 to transition back to the uninstalled state. For example, an operator or user may be required to rotate the movable component 204 in a desired direction to unlock the connector body 202 and the fitting 206.

With the movable component 204 in the uninstalled state (FIG. 15), the digital tag 219 may be at least partially aligned circumferentially and overlap with the digital blocker 226. In this way, for example, the digital signal output by the digital tag 219 may be blocked and prevented from being read by an external receiver or antenna. As the movable component 204 transitions to the installed state, the digital tag 219 and the digital blocker 226 are moved (e.g., rotated) relative to one another. Once the movable component 204 reaches the installed state, the digital blocker 226 may be rotationally offset from the digital tag 219, such that the digital blocker 226 does not overlap with digital tag 219. In this installed state (FIG. 16), the digital signal output by the digital tag 219 may be unblocked and the digital tag 219 may be read by an external receiver or antenna. Thus, the digital tag 219 and the digital blocker 226 may provide a status of the connection between the connector body 202 and the fitting 206 as the movable component 204 transitions between the uninstalled state and the installed state.

It should be appreciated that the above-described functionality of the digital tag 219 and the digital blocker 226 would perform equally as well with the positions of the digital tag 219 and the digital blocker 226 reversed. That is, in some embodiments, the digital tag 219 may be arranged on the movable component 204, and the digital blocker 226 may be arranged on the connector body 202.

FIGS. 17-20 illustrate another connector assembly 300 according to the present disclosure. The connector assembly 300 may be similar in design and functionality to the connector assembly 200, with similar elements identified using like reference numerals, except as described below or as apparent from the figures. In some embodiments, the digital blocker 226 may be integrated into the movable component 204. For example, in some embodiments, the movable component 204 may be fabricated from a material configured to block digital signals. In some embodiments, a portion of the movable component 204 that interacts and/or aligns with the digital tag 219 may be fabricated from or include additives (e.g., resins) that enable the blocking of digital signals. In some embodiments, the movable component 204 may include a separate shielding material attached thereto or integrated therein.

In the illustrated embodiment, the movable component 204 may include a window 302 that extends radially therethrough. The window 302 is configured to align and overlap with the digital tag 219 while the movable component 204 is rotated during installation of the fitting 206 into the connector body 202.

During installation, when the movable component 204 is in the uninstalled state (FIG. 18), at least a portion of the movable component 204 may be aligned and overlap with the digital tag 219, which blocks the digital signal output thereby. Once the movable component 204 is rotated to the installed state (transition from FIGS. 18 to 19 to 20), the window 302 aligns rotationally with the digital tag 219, such that the digital tag 219 is unblocked by the movable component 204. In this way, the digital signal output by the digital tag 219 may be read by an external receiver or antenna. The selective blocking and unblocking of the digital tag 219, via the window 302, may provide a status of the connection between the connector body 202, the movable component 204, and the fitting 206 as the movable component 204 transitions between the uninstalled state and the installed state.

In some embodiments, the reading of the digital tags described herein may be accomplished by an antenna or receiver that may be incorporated into a fixture on an assembly line. The fixture may surround an article of manufacture (e.g., a vehicle) as it travels along an assembly line, and may include multiple antennas and receivers. In this way, any and all components with integrated digital tags may be read at the same time, and the connection status of all the digital tags may be used to indicate the completeness of installation/assembly, prior to the article moving forward on the assembly line.

In some embodiments, the reading of the digital tags described herein may be accomplished by a receiver/antenna that may be integrated into an operator or users glove. In this way, as the operator or user completes installation of a component containing a digital tag, the glove may be in close proximity to, or in contact with, the component. At this time, the antenna/receiver may attempt to read the digital tag and provide an indication of the status of installation (e.g., complete or incomplete).

In some embodiments, a receiver/antenna may be incorporated into a wand or other handheld unit that an operator or user may hold and place within the proximity of a component with a digital tag.

While the invention is described in connection with registering correct installation of a connector body and a fitting, one skilled in the art will understand that the concepts herein may be utilized with respect to registering installation of any two components. In some embodiments, the embodiments herein may be utilized with respect to a two-part fastener system to register whether a first component of the fastener system has been properly assembled within a second component of the fasteners. In a non-limiting example, the concepts of the present invention may be utilized with a combination pin and grommet fasteners, for example, the pin and grommet shown in U.S. Pat. No. 7,954,206 to Scroggie et al. and entitled "Pin and Grommet Fastener Assembly," and assigned to the assignee of the present application, the disclosure of which is hereby incorporated by reference in its entirety. Further, in a similar manner, the concepts of the present invention may be utilized with any two part fastener system.

In any case, the ability to digitally monitor the status of connection between two components in a connector removes the need for an operator or user to be the sole source of verification that the connection is successful. In addition, the digital outputs recorded may be electronically tracked in a production control system and monitored for performance metrics.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Thus, while the invention has been described in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

We claim:

1. A connector assembly comprising:
   a connector body;
   a movable component selectively movable between an uninstalled state and an installed state;
   a digital tag; and
   a digital blocker,
   wherein when the movable component is moved from the uninstalled state to the installed state, the digital blocker is moved relative to the digital tag from a position where the digital tag is blocked by the digital blocker to a position where the digital tag is unblocked by the digital blocker, thereby providing a digital indication of a successful connection between the connector body and the movable component,
   wherein the digital blocker is attached to the movable component.

2. The connector assembly of claim 1, wherein the digital tag is attached to the movable component.

3. The connector assembly of claim 1, wherein the digital tag is attached the connector body.

4. The connector assembly of claim 1, wherein the digital blocker is attached to the connector body.

5. The connector assembly of claim 1, wherein the digital blocker is integrated into the movable component.

6. The connector assembly of claim 5, wherein the movable component is at least partially fabricated from a material configured to block digital signals.

7. The connector assembly of claim 5, wherein the movable component includes a window configured to align with the digital tag when the movable component is in the installed state, thereby unblocking the digital tag.

8. The connector assembly of claim 1, wherein the movable component is moved between the uninstalled state and the installed state in response to a linear input force.

9. The connector assembly of claim 1, wherein the movable component is rotatably movable between the uninstalled state and the installed state.

10. The connector assembly of claim 1, wherein when the movable component is in the uninstalled state, the movable component is unlocked relative to the connector body.

11. The connector assembly of claim 1, wherein when the movable component is in the installed state, the movable component is locked relative to the connector body.

12. The connector assembly of claim 1, further comprising a fitting.

13. The connector assembly of claim 12, wherein an end of the fitting is configured to be inserted into the connector body and the movable component.

14. The connector assembly of claim 13, wherein when the movable component transitions to the installed state, a notch of the fitting is aligned with a body slot of the connector body and a clip is received within the notch and the body slot to lock the connector body relative to the fitting and the movable component.

15. The connector assembly of claim 1, wherein the digital tag is a radio frequency indicator (RFID) tag.

16. The connector assembly of claim 1, wherein the digital indication is a radio frequency identification (RFID) tag.

17. A connector assembly comprising:
a connector body;
a movable component selectively movable between an uninstalled state and an installed state;
a digital tag; and
a digital blocker,
wherein selective movement of the movable component between the uninstalled state and the installed state results in blocking and unblocking of the digital tag via relative movement between the digital blocker and the digital tag, and wherein blocking and unblocking the digital tag via relative movement between the digital blocker and the digital tag provides a digital status of a connection between the connector body and the movable component,
wherein the digital tag is attached to the movable component.

18. A method for indicating a connection status on a connector assembly, the connector assembly including a connector body, a movable component, a digital tag, a digital blocker, and a fitting, the method comprising:
blocking, via the digital blocker, an output signal of the digital tag;
inserting an end of the fitting into the connector body;
moving the movable component, attached to the digital blocker, relative to the connector body from an uninstalled state to an installed state;
in response to moving the movable component relative to the connector body from the uninstalled state to the installed state, unblocking, via movement of the digital blocker relative to the digital tag, the output signal of the digital tag; and
providing an indication of a successful connection status between the fitting and the connector body based on the unblocked output signal from the digital tag.

19. The method of claim 18, wherein blocking, via the digital blocker, the output signal of the digital tag comprises:
at least partially overlapping the digital blocker with the digital tag.

20. The connector assembly of claim 1, wherein the digital tag and the digital blocker are configured to axially align when the movable component is in the uninstalled state.

* * * * *